United States Patent
Numata

(10) Patent No.: US 11,941,261 B2
(45) Date of Patent: Mar. 26, 2024

(54) STORAGE DEVICE

(71) Applicant: KIOXIA CORPORATION, Tokyo (JP)

(72) Inventor: Kenichi Numata, Tokyo (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/900,417

(22) Filed: Aug. 31, 2022

(65) Prior Publication Data

US 2023/0297251 A1    Sep. 21, 2023

(30) Foreign Application Priority Data

Mar. 18, 2022    (JP) .................... 2022-044310

(51) Int. Cl.
*G06F 3/06*    (2006.01)

(52) U.S. Cl.
CPC .......... *G06F 3/0622* (2013.01); *G06F 3/0658* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 10,397,104 B2 | 8/2019 | Johnsen et al. |
| 10,635,316 B2 | 4/2020 | Singh et al. |
| 2017/0177222 A1 | 6/2017 | Singh et al. |
| 2017/0257315 A1 | 9/2017 | Johnsen et al. |
| 2019/0384923 A1 | 12/2019 | Leitao et al. |
| 2021/0072893 A1 | 3/2021 | Singh et al. |

*Primary Examiner* — Kevin Verbrugge
(74) *Attorney, Agent, or Firm* — Kim & Stewart LLP

(57) ABSTRACT

According to one embodiment, a storage device includes a first storage region assigned to a first user and a second storage region assigned to a second user. A first controller is capable of providing a data protection function to the first and second storage regions, and a second controller is capable of providing the data protection function to the second storage region. The first controller stores a table with information about the data protection function. The second controller can refer to the table. The first controller has a authority to execute a user authentication for the first storage region and the second storage region to determine whether the data protection function can be provided for the first or second storage regions.

20 Claims, 15 Drawing Sheets

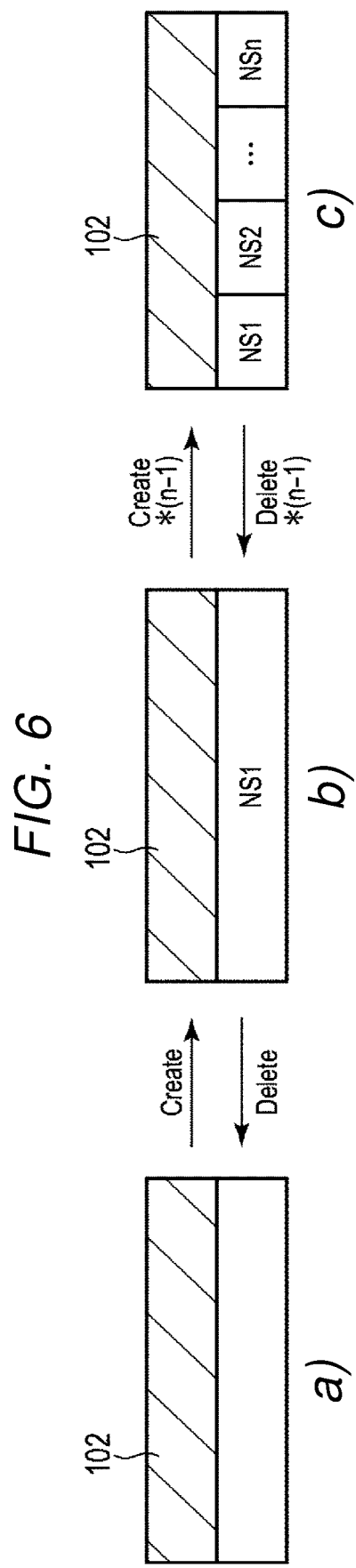

FIG. 9A
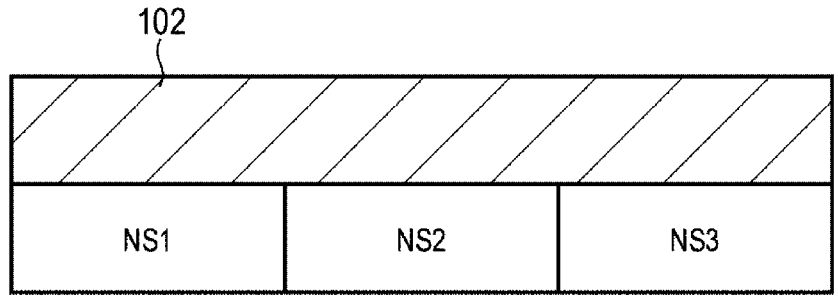
FIG. 9B
| RANGE | NAMESPACE | ENCRYPTION KEY |
|---|---|---|
| GLOBAL RANGE 102 | NS1, NS2, NS3 | MEK1, MEK2, MEK3 |
FIG. 10A
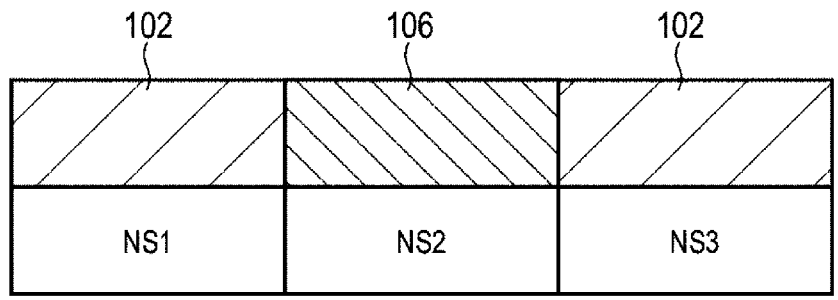
FIG. 10B
| RANGE | NAMESPACE | ENCRYPTION KEY |
|---|---|---|
| GLOBAL RANGE 102 | NS1, NS3 | MEK1, MEK3 |
| NS GLOBAL RANGE 106 | NS2 | MEK2 |

| RANGE | NAMESPACE | ENCRYPTION KEY |
|---|---|---|
| GLOBAL RANGE 102 | NS1, NS3 | MEK1, MEK3 |
| NS GLOBAL RANGE 106 | NS2 | MEK2 |
| NS NON-GLOBAL RANGE R1 | NS2 | MEK2-1 |

FIG. 14

| UID | Name | Range Start | Range Length | ReadLocked | WriteLocked | Namespce ID | Namespce Global Range | VF Assigned |
|-----|------|-------------|--------------|------------|-------------|-------------|----------------------|-------------|
| **** | GLOBAL RANGE | **** | **** | TRUE | TRUE | 1 | FALSE | FALSE |
| **** | RANGE 1 | 0 | 0 | TRUE | TRUE | 2 | TRUE | FALSE |
| **** | RANGE 2 | 0 | 0 | TRUE | TRUE | 3 | TRUE | TRUE |
| **** | RANGE 3 | 0 | 0 | TRUE | TRUE | 4 | TRUE | TRUE |

FIG. 15

| UID | Name | Encrypt Support | Max Ranges | Alignment Required | Logical BlockSize | Alignment Granularity | Lowest AlignedLBA | Single UserMode Ranges | RangeStartLength Policy |
|---|---|---|---|---|---|---|---|---|---|
| 00 00 08 01 00 00 00 01 | VU (Vendor Unique) | Media Encryption | VU | VU | VU | VU | VU | RANGE 2 (DESIGNATION TO Activate or Reactivate) | 0 or 1 (DESIGNATION TO Activate or Reactivate) |

STORAGE DEVICE

CROSS-REFERENCE TO RELATED APPLICATION(S)

This application is based upon and claims the benefit of priority from Japanese Patent Application No. 2022-044310, filed Mar. 18, 2022, the entire contents of which are incorporated herein by reference.

FIELD

Embodiments described herein relate generally to a storage device.

BACKGROUND

Peripheral Component Interconnect Express (PCI-e™) is widely known as an extended interface standard for a serial transfer method for high-speed data communication. There is Single-Root I/O Virtualization (SR-IOV) as a standard for showing a single device conforming to this PCI-e standard as a storage device configured with a plurality of virtual devices (Virtual Function). SR-IOV assigns a dedicated memory space to each virtual device. When IO access is performed from a host to the storage device, a DMA transfer is performed by bypassing a Virtualization Intermediary ("VI") (also referred to as Hypervisor), which is an overhead in access performance. In addition, the VI abstracts a physical resource, separates a plurality of physical resources, and maps the plurality of physical resources to virtual resources.

There is also a TCG standard proposed by Trusted Computing Group (TCG) as a data protection function of a storage device. However, the storage device of the current TCG standard does not sufficiently correspond to the storage device of the SR-IOV standard. Therefore, there is a possibility that data stored in the storage device conforming to the SR-IOV standard is not sufficiently protected.

BRIEF DESCRIPTION OF THE DRAWINGS

FIG. 6 depicts examples of assignment/deassignment of a namespace region in a device according to an embodiment.

FIGS. 9A and 9B are diagrams showing an example of a relationship between a range and an encryption key of a storage device according to an embodiment.

FIGS. 10A and 10B are diagrams showing another example of a relationship between a range and an encryption key of a storage device according to an embodiment.

FIG. 14 is a diagram showing an example of a Locking table stored in a storage device according to an embodiment.

FIG. 15 is a diagram showing an example of a Locking-Info table stored in a storage device according to an embodiment.

DETAILED DESCRIPTION

Figure 1:
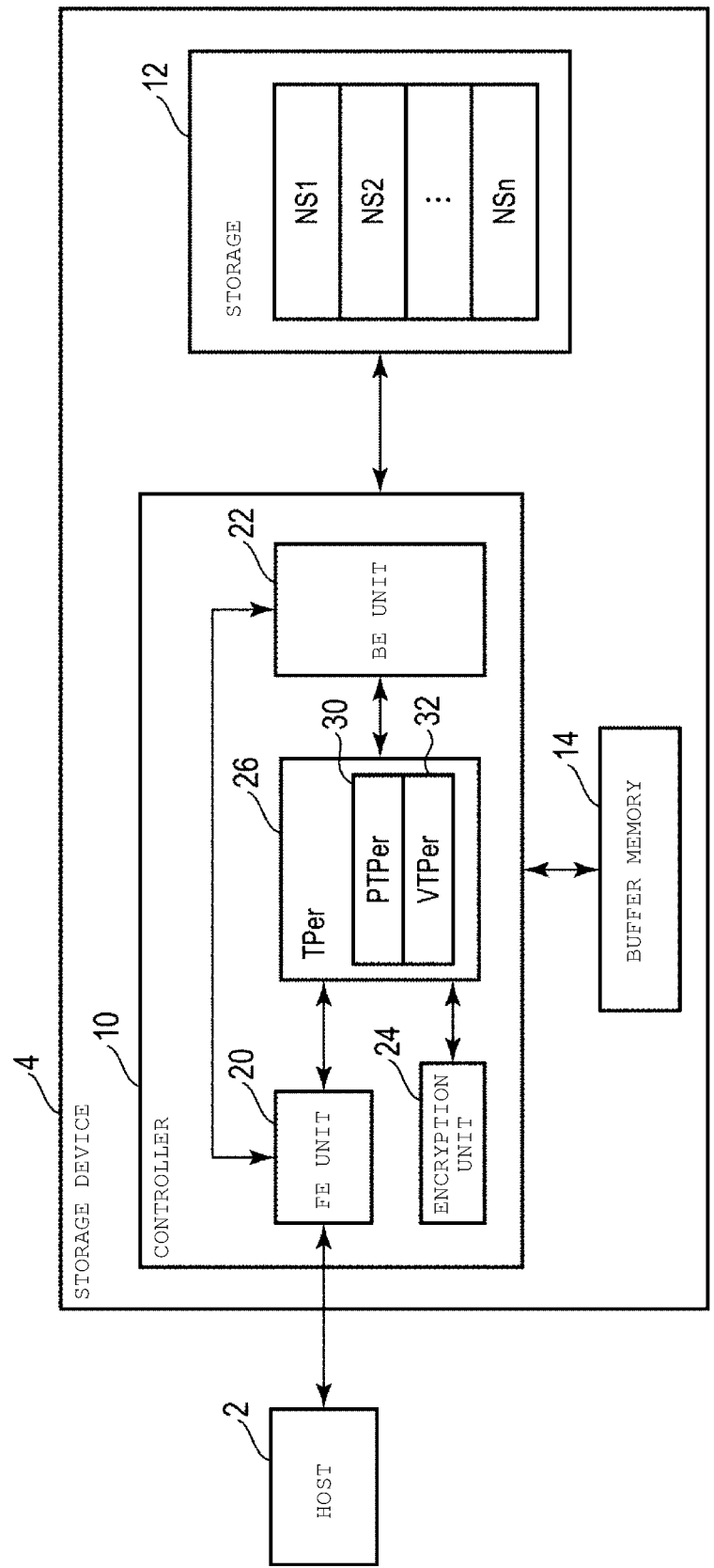
FIG. 1 is a block diagram showing an example of an information processing system including a storage device according to an embodiment and a host device connectable to the storage device.

Embodiments provide a storage device having an improved data protection function.

In general, according to one embodiment, a storage device includes a first storage region to which a first user is assigned and a second storage region to which a second user is assigned; a first controller capable of providing a data protection function for the first storage region and a data protection function for the second storage region; and a second controller capable of providing the data protection function for the second storage region. The first controller includes a table for storing information regarding the data protection function. The second controller is capable of referring to the table. The first controller has a first authority to execute a first user authentication for the first storage region and a second authority to execute a second user authentication for the second storage region. The first controller provides the data protection function of the first storage region when the first user authentication is successful. The first controller provides the data protection function for the second storage region when the second user authentication is successful.

Hereinafter, certain example embodiments will be described with reference to the drawings. The following description and examples are provided to explain the technical ideas and concepts of the present disclosure, and these technical ideas and concepts are not necessarily limited by structures, shapes, arrangements, materials of the example elements or other aspects of the example embodiments. Modifications apparent to those of ordinary skill in the art naturally fall within the scope of present disclosure.

For clarity in explanation, various dimensions (a size, a thickness, a plane dimension, a shape, and the like) of each depicted element in the drawings may be changed and schematically represented with respect to those of an actual embodiment. Likewise, elements with different dimensional relationships and ratios therebetween may be included in different drawings. In general, the same reference numbers will be used for the same elements or aspects depicted in different drawings, and duplicate explanations thereof may be omitted from the description of subsequent drawings or embodiments. Although some elements may be given a plurality of names, the names are merely examples provided for purposes of explanation, and such elements may have other names not used in the description. In the following description, use of the term "connection" or "connected" may include not only direct connection between two elements described as "connected to" (on "in connection with") one another but also the possibility of a connection made via another element interposed therebetween.

FIG. 1 is a block diagram showing an example of an information processing system including a storage device 4 according to an embodiment and a host device 2 ("host 2") connectable to the storage device 4. The storage device 4 operates conforming to the SR-IOV standard. The host 2 is a server or a personal computer. The host 2 and the storage device 4 are connected according to the PCIe standard. The host 2 and the storage device 4 execute communication according to the Non-Volatile Memory Express (NVMe®) standard. The storage device 4 is implemented by a Hard Disk Drive (HDD) or a Solid-State Drive (SSD).

The storage device 4 has a storage 12, a buffer memory 14, and a controller 10.

The storage 12 is a non-volatile storage medium. The storage 12 is configured with a hard disk and a non-volatile memory. Examples of non-volatile memory are NAND flash memory, NOR type flash memory, Magneto-resistive Random Access Memory (MRAM), Phase change Random Access Memory (PRAM), Resistive Random Access Memory (ReRAM), Ferroelectric Random Access Memory (FeRAM), and the like. A user region of the storage 12 may be divided into a plurality of namespace regions (Namespace regions) NS1, NS2, . . . NSn. Each of the namespace regions NS1, NS2, . . . NSn may be assigned to different users, for example.

The buffer memory 14 is configured with a volatile memory such as a Dynamic Random Access Memory (DRAM) or a Static Random Access Memory (SRAM).

The controller 10 is configured with a System On a Chip (SoC). The controller 10 controls the storage 12 based on a command transmitted from the host 2. Specifically, the controller 10 receives a write command or a read command transmitted from the host 2. When receiving the write command, the controller 10 executes a write operation of data transferred from the host 2 to the storage 12 while using the buffer memory 14 as a temporary storage region for the data. When receiving the read command, the controller 10 executes a read operation of data requested by the host 2 from the storage 12 while using the buffer memory 14 as a temporary storage region for the data.

The controller 10 has a front end (FE) unit 20, a back end (BE) unit 22, an encryption unit 24, and a trusted peripheral 26 ("TPer 26"). The TPer 26 is connected to the host 2 via the FE unit 20. The TPer unit 26 is connected to the storage 12 via the BE unit 22. The FE unit 20 controls the connection between the host 2 and the TPer 26 conforming to the SR-IOV standard.

The controller 10 includes a range function and a cryptographic erase function according to the TCG standard as a data protection function of the storage 12.

The range function is a function of dividing the user region into a plurality of sections (also referred to as a range) and setting a locked state for each range. The range function is a function of dividing the user region into a plurality of sections (hereinafter, each section is referred to as a range) and securely protecting the data recorded in each range with different encryption keys. Therefore, different users can be assigned to each range, and each user can securely manage the data recorded in the range of the assigned user region. An encryption key can be separately set for each range, and each range can be set to a locked state or an unlocked state by the respective encryption key. The locked state includes a read locked state and a write locked state. The unlocked state includes a read unlocked state and a write unlocked state. The data stored in the range of the read locked state cannot be read. The data stored in the range of the read unlocked state can be read. It is not possible to write data to the range of the write locked state. It is possible to write data to the range of the write unlocked state. The user who can set the locked state and the unlocked state is the user assigned to the range.

The cryptographic erase function is a function of making it impossible to decrypt all the data in the range by regenerating (that is, changing) the encryption key of the user data for each range and invalidating all the data in the range. The user who can perform the cryptographic erase is a user assigned to the range.

The TPer 26 is a functional block for providing a data protection function according to the TCG standard. The storage device 4 has at least one TPer 26.

The SR-IOV standard storage device includes a virtual function device (Virtual Function ("VF")) and a physical function device (Physical Function ("PF")). The PF and the VF are devices that provide PCIe functions. The PF device supports the SR-IOV function and is accessible to SR-PCIM, virtualization intermediary (VI) or a system image (SI). Single-Root PCI Manager (SR-PCIM) is a software component mounted on VI, and configures and manages PF and VF devices. In this context, the System Image (SI) is a software component including an operating system (OS) and an application assigned to be executed on a virtual resource. The SR-IOV function includes, for example, a function of creating the VF. Generally, the PCIe functionality provided by the VF is lesser than the PCIe functionality provided by the PF. The PF is included in the FE unit 20 and the BE unit 22. The VF is also included in the FE unit 20 and the BE unit 22.

The TPer 26 includes a physical TPer 30 ("PTPer 30") which is a functional block for providing a data protection function for the PF and the VF, and a virtual TPer 32 ("VTPer 32") which is a functional block for providing a data protection function for the VF. The PTPer 30 and the VTPer 32 can be connected to the host 2 via the FE unit 20 conforming to the SR-IOV standard. The FE unit 20 controls the connection between the host 2, and the PTPer 30 and the VTPer 32 conforming to the SR-IOV standard.

The PTPer 30 provides a TPer function and a VTPer management function of the TCG standard of the related art. The VTPer management function is a function by which the PTPer 30 creates or deletes the VTPer 32 and a function of transferring an authority of the data protection function to the VTPer 32. The authority of the data protection function includes, for example, the authority to set the range function and the authority to execute the cryptographic erase. Delegating the authority of the data protection function means delegating an authentication authority. The PTPer 30 corresponds to all commands related to the data protection function of the TCG standard. The VTPer 32 cannot correspond to some commands. The number of VFs may be plural. If the number of VFs is plural, the controller 10 includes a plurality of VTPers 32.

By default, the VTPer 32 can only execute processing of Anybody authority. An example of processing of Anybody authority is, for example, a table reference. When the execution authority of the data protection function is transferred from the PTPer 30, the VTPer 32 will be able to set and execute the data protection of the namespace region and range assigned thereto.

The encryption unit 24 operates under the control of the TPer 26. The encryption unit 24 encrypts the data transferred from the host 2 and decrypts the data read from the storage 12.

The functions of the controller 10 other than the TPer 26 and the encryption unit 24 are provided by the FE unit 20 (front end unit) and the BE unit 22 (back end unit). In this context, "front end," as in FE unit 20, concerns those functions related to the interactions with the host 2 (which is said to be located in a front stage of the controller 10) and functions in the processing flow before the TPer 26. "Back end," as in BE unit 22, refers to those functions in the processing flow after the TPer 26, such as interactions with the storage 12 (which is said to be located in a back stage of the controller 10).

When the host 2 transmits the write command, the FE unit 20 receives the write command and hands over the write data to the TPer 26 together with information indicating a write destination.

Depending on whether the write destination is the PF or the VF, the PTPer 30 or the VTPer 32 determines whether the write destination is "data writable," that is, whether the write destination is in the write locked state or not. If the write destination is data writable, that is, in the write unlocked state, the PTPer 30 or the VTPer 32 delivers the write data to the encryption unit 24 and instructs the encryption unit 24 to encrypt the write data with the encryption key used in the write destination. If the write destination is not writable, that is, is in the write locked state, the PTPer 30 or the VTPer 32 notifies the FE unit 20 to that effect. The FE unit 20 returns an error to the host 2 as a response to the write command.

The encryption unit 24 encrypts the write data according to the instructions of the PTPer 30 or the VTPer 32, and delivers the encrypted write data to the PTPer 30 or the VTPer 32. The PTPer 30 or the VTPer 32 delivers the encrypted write data to the BE unit 22 via the buffer memory 14, and instructs the BE unit 22 to write to the storage 12. When the writing to the storage 12 is completed, the FE unit 20 returns that the writing was successful to the host 2 as a response to the write command.

When the host 2 transmits the read command, the FE unit 20 receives the read command and hands over information indicating the read destination to the TPer 26.

Depending on whether the read destination is the PF or the VF, the PTPer 30 or the VTPer 32 determines whether data from the designated read destination can be read, that is, whether the read destination is in the read locked state. If the read destination is readable, that is, in the read unlocked state, the PTPer 30 or the VTPer 32 notifies the FE unit 20 to that effect. If the read destination is unreadable, that is, in the read locked state, the PTPer 30 or the VTPer 32 notifies the FE unit 20 to that effect. The FE unit 20 returns an error to the host 2 as a response to the read command.

The FE unit 20 delivers information indicating the read destination to the BE unit 22 and instructs the BE unit 22 to read the data from the storage 12. The BE unit 22 delivers the data read from the storage 12 to the PTPer 30 or the VTPer 32 via the buffer memory 14. The PTPer 30 or the VTPer 32 delivers the encrypted read data received from the BE unit 22 via the buffer memory 14 to the encryption unit 24, and instructs the encryption unit 24 to decrypt the read data with the encryption key used at the read destination. The FE unit 20 receives the decrypted read data from the encryption unit 24. The FE unit 20 transmits the decrypted read data to the host 2 as a response to the read command.

Figure 2:
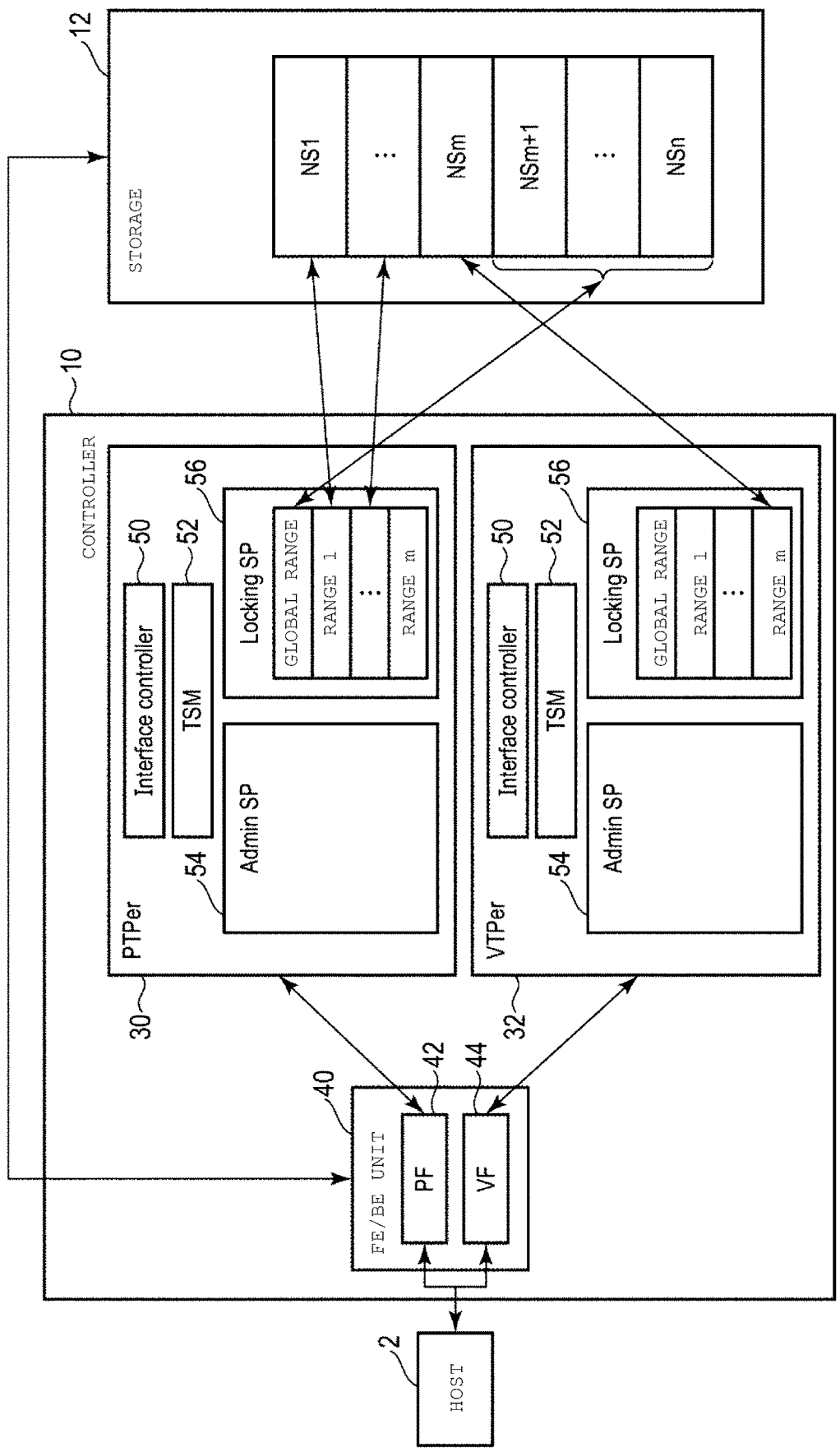
FIG. 2 is a block diagram showing an example of a data protection function of a controller of a storage device according to an embodiment.

FIG. 2 is a block diagram showing an example of the data protection function of the controller 10 of the storage device 4 according to the embodiment. The FE unit 20 and the BE unit 22 in FIG. 1 are collectively shown as the FE/BE unit 40 in FIG. 2. The FE/BE unit 40 includes a functional block 42 related to the PF and a functional block 44 related to the VF.

The PTPer 30 and the VTPer 32 have the same structure. The PTPer 30 (or the VTPer 32) includes an interface controller 50, a TPer session manager 52 ("TSM 52"), an admin security provider 54 (("Admin SP 54"), and a locking security provider 56 ("Locking SP 56").

The interface controller 50 executes a process for implementing interface-independent communication so that the communication between the PTPer 30 or the VTPer 32 and the host 2 does not depend on a specific interface. The interface controller 50 supports various interfaces designated in the TCG. In addition to NVMe, various interfaces may be Small Computer System Interface (SCSI), AT Attachment (ATA), Embedded Multi Media Card (e/MMC), and the like.

The TSM 52 manages a session that is a logical connection between the host 2 and the Admin SP 54 or Locking SP 56.

The Admin SP 54 and the Locking SP 56 are a complex of templates. A template is a collection of related tables and methods. The table is a table that includes rows and columns, or a table that contains a byte stream. TCG setting such as setting related to the data protection function is performed by a table operation that writes data related to the setting to the table. The information that the host 2 instructs the table, the Admin SP 54, and the Locking SP 56 to process is a method.

The Admin SP 54 is configured with a base template for common functions of all SPs and an Admin template for the Admin function described later. The Locking SP 56 is configured with a base template and a Locking template for the Locking function including the range function described later.

The base template defines basic functions of the Admin SP 54 and the Locking SP 56 of the table access, authority management, and the like. The base template table includes an authority table that defines an authorized user, a C_PIN table that defines a user password, and the like. Examples of the base template method include a Get method for instructing a table reference, a Set method for instructing a table update, a Revert SP method for initializing a designated SP, and the like.

The Admin template defines the Admin function, manages the entire TPer, and manages the management functions (initialization, or the like) of other SPs. As the method of the Admin template, there are a Revert method that initializes the designated SP, an Activate method that activates the Locking SP 56, and the like.

The Locking template defines the range function. The Locking template table includes a LockingInfo table that stores meta information of a range, a Locking table that stores setting related to a range function, a table that stores cryptographic logic, and the like.

The Admin SP 54 provides the Admin function. Specifically, the Admin SP 54 executes the life cycle management of the Locking SP 56, such as activating, inactivating, or initializing the Locking SP 56. Activating the Locking SP 56 means enabling the data protection function of the namespace region. Inactivating the Locking SP 56 means disabling the data protection function of the namespace region. The inactivation of the Locking SP 56 is also referred to as initialization. The Admin SP 54 is always activated. The Locking SP 56 may be always activated or inactivated by default.

The Admin SP 54 manages overall information of the TPer 26 such as the types of specifications (Security Sub-Class: SSC) supported by the TPer 26 built on the storage device 4, and the Locking SP 56. The type of SSC may differ depending on how the PTPer 30 or the VTPer 32 is constructed. Further, the overall information includes the number of ranges that can be set in the entire storage device 4 and the number of ranges that can be set in each namespace region, which will be described later.

The Admin SP 54 executes the life cycle management of the Locking SP 56 corresponding to the method related to the TCG transmitted from the host 2. The Activate method is defined as a method for enabling the data protection function, and the Revert method is defined as a method for disabling the data protection function.

The Locking SP 56 provides the range function and the cryptographic erase function. The Locking SP 56 can manage the encryption key, set the locked state and the unlocked state, and execute the cryptographic erase for each range. The entire user region in which the range is not set is treated as a global range. Further, the region in which the range is not set in the user region in which the range of 1 or more is set is also treated as the global range.

The table is stored in the buffer memory 14. The table is stored in a system region other than the user region of the storage 12 before the storage device 4 shuts down. The table stored in the storage 12 is stored in the buffer memory 14 when the power of the storage device 4 is turned on.

FIG. 2 shows an example of the range and the namespace region assignment. The Locking SP 56 of the PTPer 30 assigns range 1 and the like to the namespace region NS1 and the like. The Locking SP 56 of the VTPer 32 assigns the range m to the namespace region NSm. The range m is referred to as a namespace global range (NS global range). The Admin SP 54 of the PTPer 30 assigns the global range to the namespace regions NSm+1 to NSn.

Figure 3:
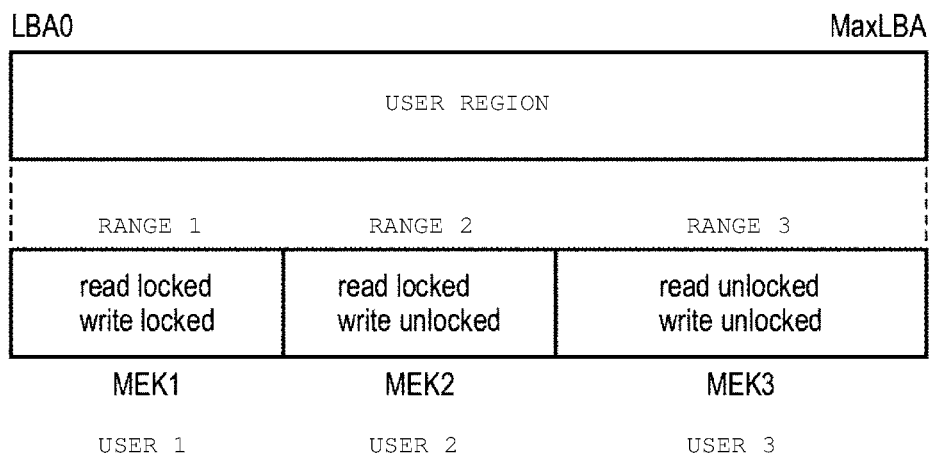
FIG. 3 is a diagram showing an example of range setting for a user region of a storage device according to an embodiment.

FIG. 3 is a diagram showing an example of range setting for the user region of the storage device according to the embodiment. The user region from a smallest logical address LBA0 to a largest logical address MaxLBA is divided into a plurality of ranges, for example, range 1, range 2, and range 3.

For example, with respect to range 1, an encryption key MEK1 is set as the data encryption key, and user 1 is assigned. User 1 sets, for example, a read locked state (read locked) and a write locked state (write locked) with respect to range 1. User 1 can perform cryptographic erase for range 1.

With respect to range 2, an encryption key MEK2 is set as the data encryption key, and user 2 is assigned. User 2 sets, for example, a read locked state (read locked) and a write unlocked state (write unlocked) with respect to range 2. With respect to range 3, an encryption key MEK3 is set as the data encryption key, and user 3 is assigned. User 3 sets, for example, a read unlocked state (read unlocked) and a write unlocked state (write unlocked) with respect to range 3.

Figure 4A:
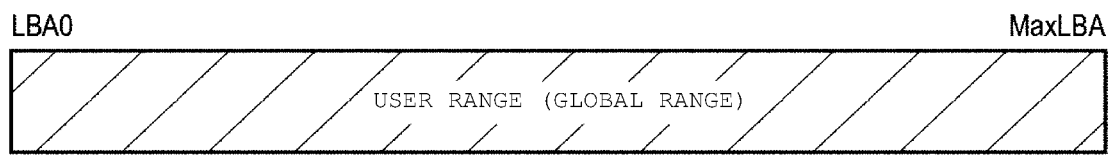
FIGS. 4A and 4B are diagrams showing an example of a global range of a storage device according to an embodiment.
Figure 4B:
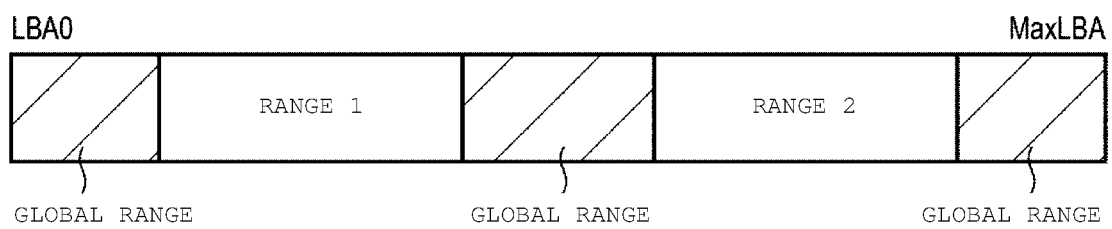

FIGS. 4A and 4B are diagrams showing an example of the global range of the storage device according to the embodiment. As shown in FIG. 3, the minimum logical address LBA0 to the maximum logical address MaxLBA are the user region, and when the range is not set as shown in FIG. 4A, the entire user region is the global range. For example, in the initial state, the entire user region is in the global range. The global range is a maximum of "number of ranges+1" regions. FIG. 4B shows a state in which two ranges (range 1 and range 2) are set in the user region. Range 1 and range 2 are non-global ranges, and user regions other than range 1 and range 2 (here, three regions in shaded regions) are global ranges. In the global range, the encryption key MEK is common, and the setting related to the range function is also common.

Figure 5A:
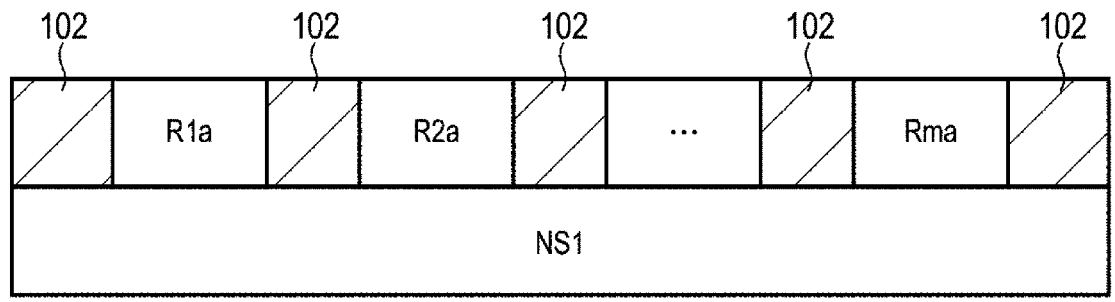
FIGS. 5A to 5C are diagrams showing an example of range setting for a namespace region of a storage device according to an embodiment.
Figure 5B:
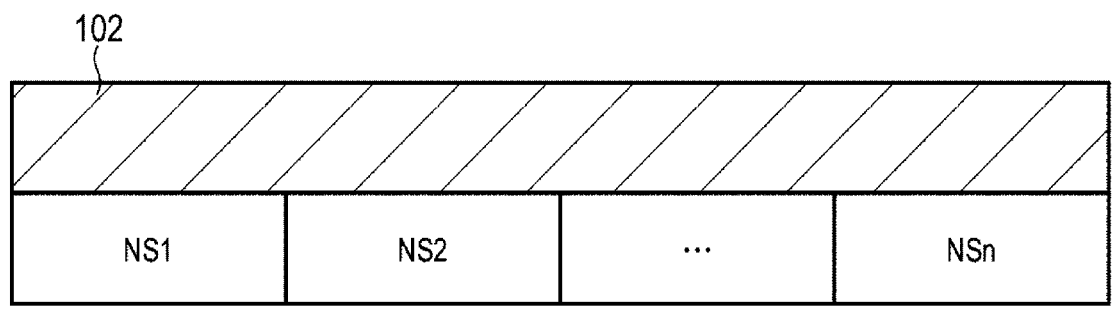
Figure 5C:
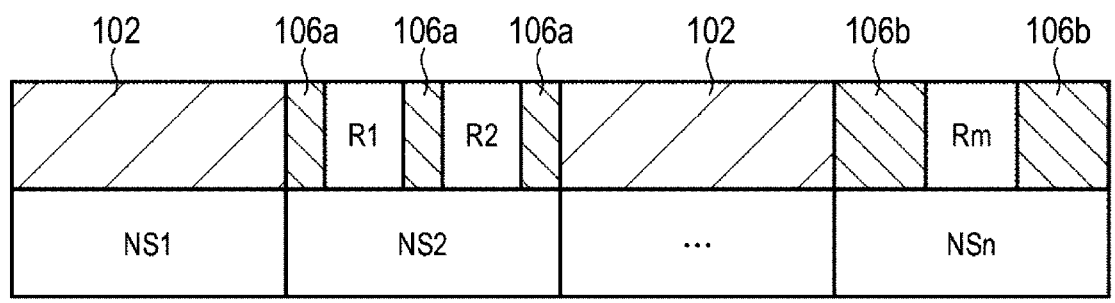

FIGS. 5A to 5C are diagrams showing an example of range setting with respect to the namespace region of the storage device according to the embodiment.

FIG. 5A shows an example of range setting in a basic specification of the TCG standard. This specification does not consider the namespace. However, if the entire user region is regarded as one namespace region NS1, it can be said that this specification relates to a multi-range/single namespace. A plurality of ranges R1a, R2a, . . . Rma are assigned to the namespace region NS1 which is the entire user region. The region of the namespace region NS1 other than the plurality of ranges R1a, R2a, . . . Rma is the global range 102. The ranges R1a, R2a, . . . Rma are referred to as non-global ranges.

FIG. 5B shows an example of range setting in the TCG storage interface interactions specification (SIIS) standard. This standard relates to the global range/multi-namespace. The user region is divided into a plurality of namespace regions NS1, NS2, . . . NSn. The global range 102 is assigned to the user region. The locked state and unlocked state set with respect to the global range 102 are reflected in all the namespace regions NS1, NS2, . . . NSn.

FIG. 5C shows an example of range setting in the TCG configurable namespace locking (CNL) standard. The TCG is established the CNL standard for providing the data protection function for each namespace when a plurality of namespaces are set. This standard relates to the multi-range/multi-namespace.

For example, the user region is divided into a plurality of namespace regions NS1, NS2, . . . NSn. The global range 102 is assigned to the namespace region NS1. The NS global range 106 is assigned to some namespace regions. For example, three NS global ranges 106a are assigned to the namespace region NS2 and the two NS global ranges 106b are assigned to the namespace region NSn.

As shown in FIG. 5C, the ranges R1 and R2 are ranges in which namespaces are not assigned to global ranges, such ranges can be called namespace non-global ranges ("NS non-global ranges"). The NS non-global ranges R1 and R2 in FIG. 5C are assigned to the namespace region NS2. Further, the NS non-global range Rm is assigned to the namespace region NSn. Among the regions of the namespace region NS2, the regions other than the NS non-global ranges R1 and R2 are NS global ranges 106a. Among the regions of the namespace region NSn, the regions other than the NS non-global range Rn are NS global ranges 106b.

FIG. 6 provides examples of assignment/deassignment of the namespace region in the storage device 4 according to the embodiment. FIG. 6, part a, the namespace region is not yet assigned to the global range 102 as a user region.

In the state shown in FIG. 6, part a, when the host 2 transmits a Namespace Management command (a "Create command") in which Create is designated in the Select (SEL) field of the NVMe standard to the storage device 4, the PTPer 30 or the VTPer 32 assigns one namespace region as a user region corresponding to the Create command.

FIG. 6, part b shows one namespace region NS1 is assigned as a user region with respect to the global range 102 of FIG. 6, part a.

In the state shown in FIG. 6, part b, when the host 2 transmits a Namespace Management command (a "Delete command") in which Delete is designated in the Select (SEL) field of the NVMe standard to the storage device 4, the PTPer 30 or the VTPer 32 deassigns the one namespace region NS1 as the user region corresponding to the Delete command.

When the assignment of the namespace region NS1 to the user region is released, the user region returns to the state shown in FIG. 6, part a.

In the state shown in FIG. 6, part b, when the host 2 transmits (n−1) Create commands to the storage device 4, the PTPer 30 or the VTPer 32 further assigns (n−1) namespace regions (NS2, . . . NSn), as shown in FIG. 6, part c, with respect to the global range 102 as the user regions corresponding to the Create command.

In the state shown in FIG. 6, part c, when the host 2 transmits (n−1) Delete commands to the storage device 4, the PTPer 30 or the VTPer 32 deassigns (n−1) namespace regions (NS2, . . . NSn) as the user regions corresponding to the Delete command. When the assignment of the namespace regions NS2, . . . NSn as the user region is released, the user region returns to the state shown in FIG. 6, part b.

Figure 7A:
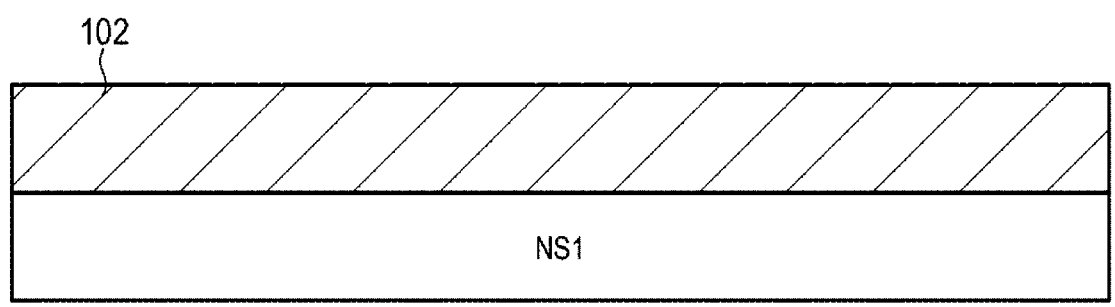
FIGS. 7A and 7B are diagrams showing an example of range setting in a case of a single namespace in a storage device according to an embodiment.
Figure 7B:
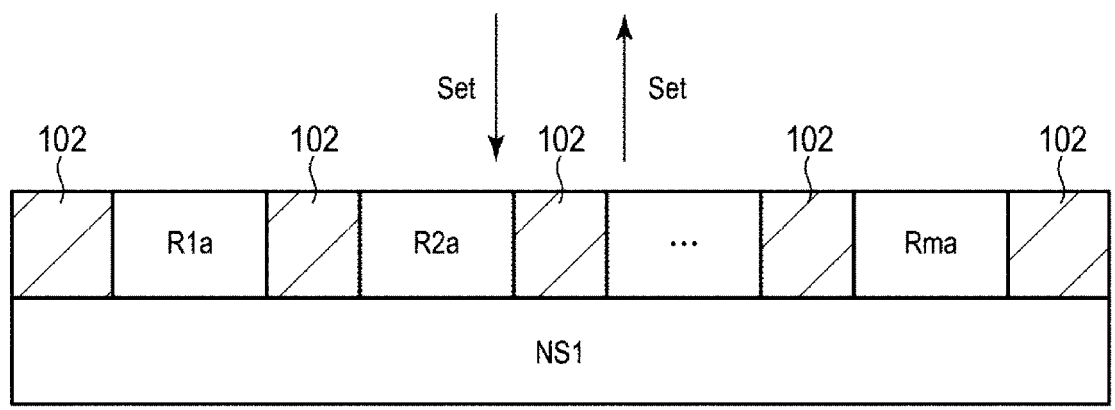

FIGS. 7A and 7B are diagrams showing an example of range setting in the case of the single namespace in the storage device according to the embodiment. FIG. 7A shows a state in which the namespace region N1 is assigned as the user region to the global range 102 as in FIG. 6, part b.

For example, when a Set method (designating "Non 0" as Range Length) of the TCG standard is transmitted from the host 2 to the storage device 4, the PTPer 30 or the VTPer 32 assigns the namespace region NS1 to one non-global range corresponding to one Set method (FIG. 7A). Here, the designation of "Non 0" means that a range of a predetermined size is set.

After that, when the Set method (designating "Non 0" as the Range Length) of the TCG standard is transmitted m times from the host 2 to the storage device 4, m non-global ranges R1a, R2a, . . . Rma are assigned to the namespace region NS1 as shown in FIG. 7B. The region of the namespace region NS1 other than the non-global ranges R1a, R2a, . . . Rma is maintained as the global range 102.

After that, in the state shown in FIG. 7B, when the Set method ("0" is designated as the Range Length) is transmitted from the host 2, the PTPer 30 or the VTPer 32 deassigns one non-global range corresponding to one Set method. Here, the designation of "0" means that the range setting is released.

In this way, when the Set method (designating "0" as the Range Length) of the TCG standard is transmitted m times from the host 2 and the assignment of the non-global ranges R1, R2, . . . Rm is released, the user region returns to the state shown in FIG. 7A.

Figure 8A:
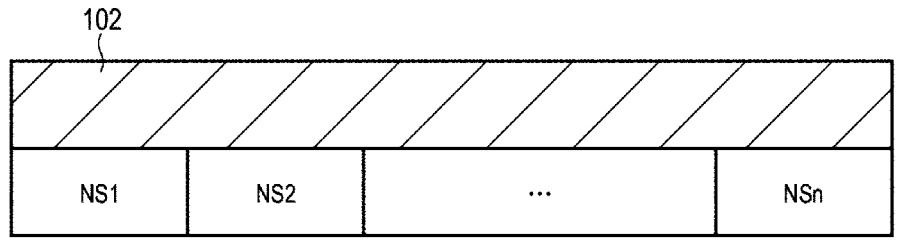
FIGS. 8A to 8D are diagrams showing an example of range setting in a case of a multi-namespace in a storage device according to an embodiment.

FIGS. 8A to 8D are diagrams showing an example of range setting in the case of the multi-namespace in the storage device according to the embodiment. FIG. 8A shows a state in which the global range 102 is assigned to the namespace regions NS1, NS2, . . . NSn as in FIG. 6, part c.

Figure 8B:
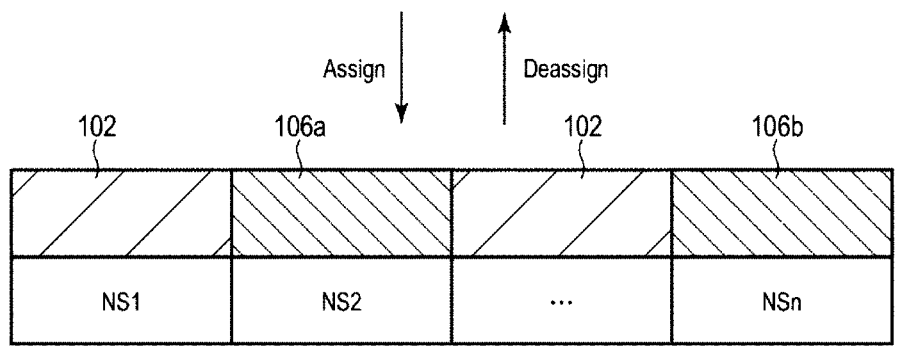

After that, as shown in FIG. 8B, when the Assign method of the TCG standard is transmitted from the host 2, the PTPer 30 or the VTPer 32 assigns one NS global range to one namespace region corresponding to one Assign method. For example, as shown in FIG. 8B, the NS global range 106a is assigned to the namespace region NS2 corresponding to one Assign method, and the NS global range 106b is assigned to the namespace region NSn corresponding to the other Assign method.

In the state shown in FIG. 8B, when the Deassign method of the TCG standard is transmitted from the host 2, the PTPer 30 or the VTPer 32 deassigns one NS global range corresponding to the Deassign method. Here, for example, when two different Deassign methods are transmitted from the host, the assignment of the NS global ranges 106a and 106b is released, and the user region returns to the state shown in FIG. 8A.

Figure 8C:
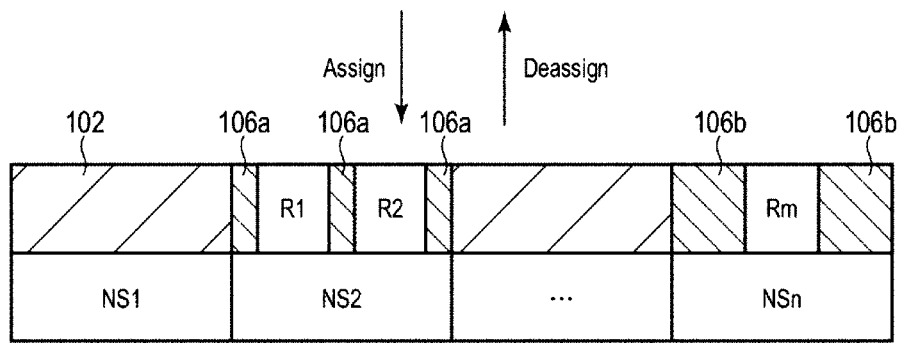

In the state shown in FIG. 8B, when the Assign method ("Non 0" is designated as the Range Length) is transmitted from the host 2 to the namespace region to which the NS global ranges 106a and 106b are assigned, the PTPer 30 or the VTPer 32 assigns one NS non-global range to the namespace region corresponding to one Assign method. FIG. 8C shows, for example, a state in which the NS non-global ranges R1 and R2 are assigned to the namespace region NS2 corresponding to two Assign methods, and the NS non-global range Rm is assigned to the namespace region NSn corresponding to one Assign method. The region of the namespace region NS2 other than the NS non-global ranges R1 and R2 is the NS global range 106a. The namespace region NSn other than the NS non-global range Rm is the NS global range 106b.

In the state shown in FIG. 8C, when the Deassign method ("0" is designated as the Range Length) is transmitted from the host 2 to the namespace region to which the NS non-global ranges R1, R2, and Rm are assigned, the PTPer 30 or the VTPer 32 releases the assignment of one NS non-global range corresponding to one Deassign method. In the state shown in FIG. 8C, when the assignment of the NS non-global ranges R1, R2, and Rm is released, the user region returns to the state shown in FIG. 8B.

Figure 8D:
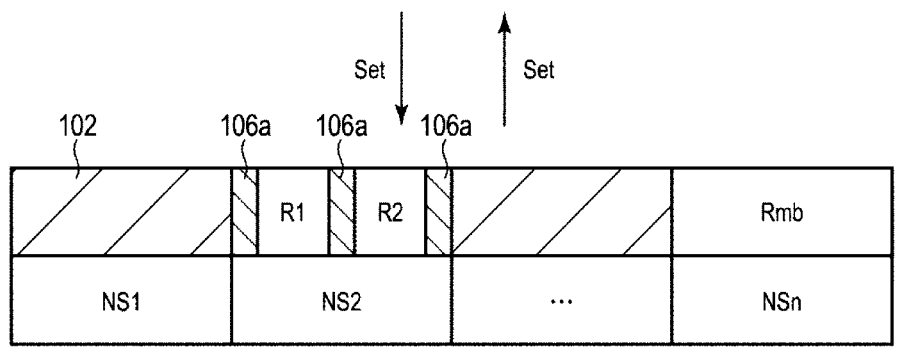

In the state shown in FIG. 8C, when the Set method ("0" is designated as the Range Length) is transmitted from the host 2, the PTPer 30 or the VTPer 32 changes one NS non-global range to the NS global range corresponding to one Set method. FIG. 8D shows a state in which the NS non-global range Rm shown in FIG. 8C was changed to the NS global range Rmb.

In the state shown in FIG. 8D, when the Set method ("Non 0" is designated as the Range Length) is transmitted from the host 2, the PTPer 30 or the VTPer 32 changes one NS global range to the NS non-global range corresponding to one Set method. FIG. 8C shows a state in which the NS global range Rmb shown in FIG. 8D was changed to the NS non-global range Rm.

FIGS. 9A and 9B are diagrams showing an example of a relationship between the range and the encryption key of the storage device according to the embodiment. In this example, the namespace regions NS1, NS2, and NS3 are assigned to the user region, and the global range 102 is assigned to the entire user region (FIG. 9A). In order to comply with the TCG CNL standard, it is necessary to set at least one encryption key MEK for each namespace region. MEK1, MEK2, and MEK3 are respectively assigned as encryption keys for the namespace regions NS1, NS2, and NS3, and the encryption keys MEK1, MEK2, and MEK3 are associated with the global range 102 (FIG. 9B). The relationship between the global range 102 and the encryption key is one-to-many. When the data stored in the global range 102 is deleted by the cryptographic erase function, all the encryption keys MEK1, MEK2, and MEK3 associated with the global range 102 are regenerated.

FIGS. 10A and 10B are diagrams showing another example of the relationship between the range and the encryption key of the storage device according to the embodiment. FIGS. 10A and 10B show a state in which the NS global range 106 is assigned to the namespace region NS2 by the Assign method in the state shown in FIGS. 9A and 9B (FIG. 10A). Even if the NS global range 106 is assigned to the namespace region NS2, the relationship between the namespace region and the encryption keys MEK1, MEK2, and MEK3 is not changed, but the association between the encryption key and the range is changed. The encryption keys MEK1 and MEK3 are associated with the global range 102, and the encryption key MEK2 is associated with the NS global range 106 (FIG. 10B). The relationship between the NS global range 106 and the encryption key is one-to-one.

Figures 11A, 11B:
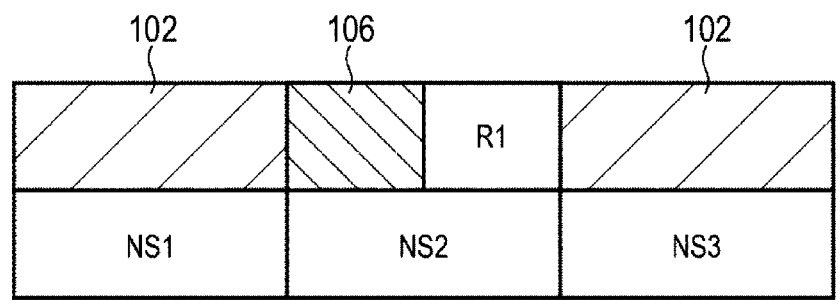
FIGS. 11A and 11B are diagrams showing another example of a relationship between a range and an encryption key of a storage device according to an embodiment.

FIGS. 11A and 11B are diagrams showing another example of the relationship between the range and the encryption key of the storage device according to the embodiment. FIGS. 11A and 11B show a state in which the NS non-global range R1 is assigned to the namespace region NS2 by the Assign method in the state shown in FIGS. 10A and 10B (FIG. 11A). As the encryption key, an encryption key MEK2-1 of the NS non-global range R1 is added. The encryption keys MEK1 and MEK3 are associated with the global range 102, the encryption key MEK2 is associated with the NS global range 106, and the encryption key MEK2-1 is associated with the NS non-global range R1 (FIG. 11B). The relationship between the NS non-global range R1 and the encryption key is one-to-one.

Figure 12:
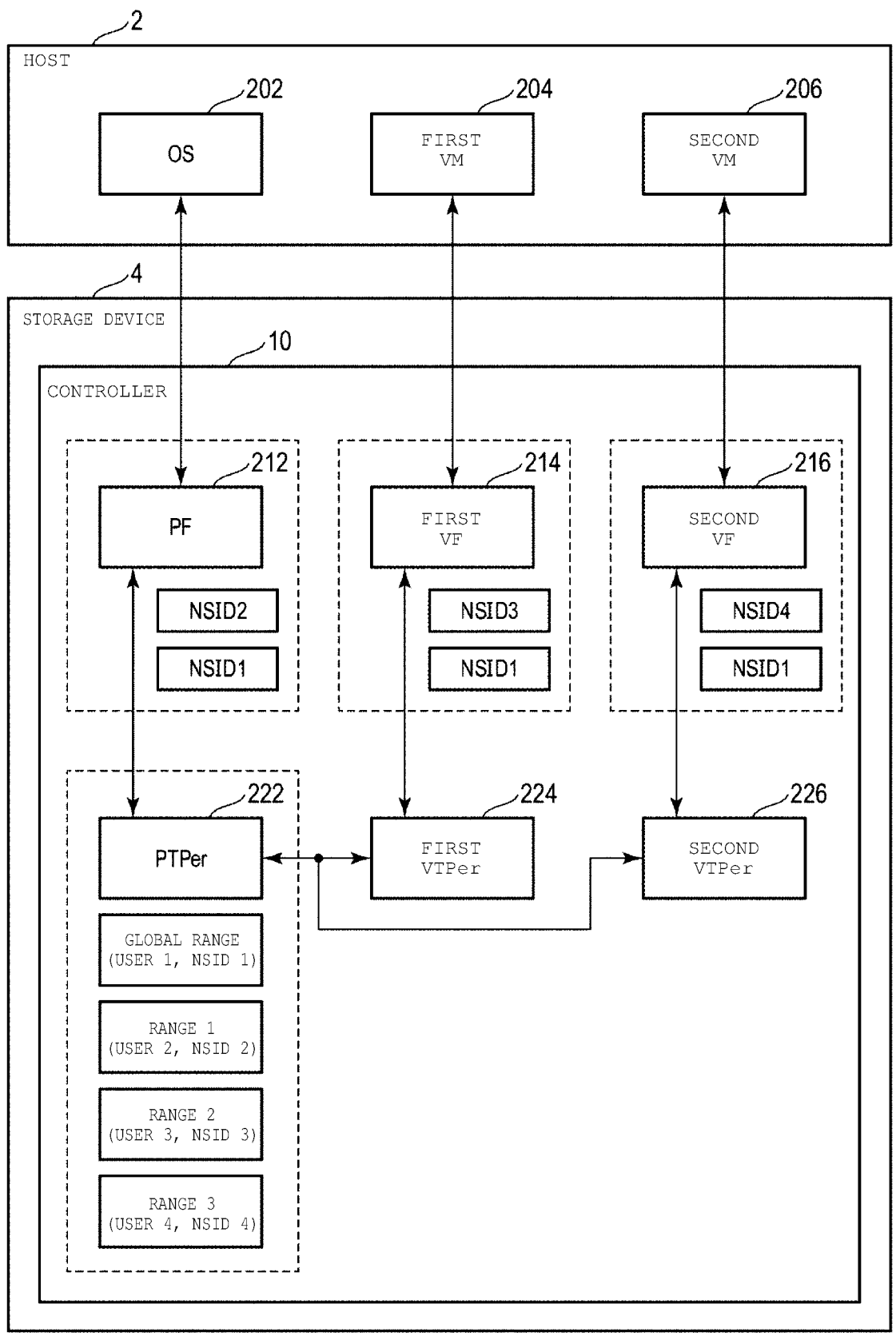
FIG. 12 is a block diagram for explaining an example of a data protection function of a storage device according to an embodiment.

FIG. 12 is a block diagram showing a logical configuration for explaining an example of the data protection function of the storage device 4 according to the embodiment.

The controller 10 of the storage device 4 includes a PF 212 which is a physical device connected to an OS (for example, a boot OS) 202 in the host 2 and a PTPer 222 which can provide a data protection function for a PF 212. The PTPer 222 is connected to the PF 212. The PF 212 corresponds to the PF 42 shown in FIG. 2. The PTPer 222 corresponds to the PTPer 30 shown in FIGS. 1 and 2. User 1 and user 2 are assigned to the PF 212. The namespace regions NSID1 and NSID2 are assigned to the PF 212. The global range and range 1 are respectively assigned to the namespace regions NSID1 and NSID2. User 1 and user 2 are respectively assigned to the global range and range 1. When the host 2 transmits the Create command to the storage device 4, the controller 10 assigns the namespace region NSID1 to user 1, assigns the namespace region NSID2 to user 2, and assigns the namespace regions NSID1 and NSID2 to the user region of the PF 212 corresponding to the Create command.

After booting the OS 202, the host 2 generates a first virtual machine (VM) 204 and a second virtual machine (VM) 206. The OS of the first VM 204 and the second VM 206 may be different from the OS 202. The number of virtual machines may be just one, or may be three or more. The first VM 204 and the second VM 206 may read or write different data to the storage device 4. For example, the first VM 204 may read or write image data, and the second VM 206 may read or write text data.

When the host 2 generates the first VM 204, an instruction for generating a first virtual device 214 ("first VF 214") and a first VTPer 224 that provides a data protection function for the first VF 214 is transmitted to the storage device 4. The first VF 214 corresponds to the VF 44 shown in FIG. 2. The first VTPer 224 corresponds to the VTPer 32 shown in FIGS. 1 and 2. The host 2 assigns user 1 and user 3 to the first VF 214. When the host 2 transmits the Create command to the storage device 4, the controller 10 assigns the namespace region NSID1 for user 1 and the namespace region NSID3 for user 3 to the user region of the first VF 214 corresponding to the Create command.

When the host 2 generates the second VM 206, the host 2 transmits an instruction for generating a second virtual device 216 ("second VF 216") and a second VTPer 226 that provides the data protection function for the second VF 216 to the storage device 4. The second VF 216 corresponds to the VF 44 shown in FIG. 2. The second VTPer 226 corresponds to the VTPer 32 shown in FIGS. 1 and 2. The host 2 assigns user 1 and user 4 to the second VF 216. When the host 2 transmits the Create command to the storage device 4, the controller 10 assigns the namespace region NSID1 for user 1 and the namespace region NSID4 for user 4 to the user region of the second VF 216 corresponding to the Create command.

The namespace region assigned to the user region of a plurality of physical devices and virtual devices is also referred to as a common namespace region. Here, since the namespace region NSID1 is assigned to the user regions of the PF 212, the first VF 214, and the second VF 216, it is referred to as the common namespace region. The namespace regions NSID2, NSID3, and NSID4 assigned only to the user region of one physical device or virtual device are also referred to as private namespace regions.

A plurality of users of the storage device 4 can apply the data protection function for the namespace region assigned to each user. User authentication is required to apply the data protection function. The controller 10 performs the user authentication before providing the user with the data protection function.

The PTPer 222 has the authentication authority of all the users (here, user 1, user 2, user 3, and user 4) set in the storage device 4. The user authentication authority is also called user authority. Here, user 1, user 2, user 3, and user 4 are set as the user authentication authority of PTPer 222. If the authentication is successful for each user, the PTPer 222 can provide the data protection function for the namespace region assigned to each user.

The user authentication authority of the first VTPer 224 and the second VTPer 226 is set to "Anybody". The fact that the user authentication authority setting is Anybody means that the first VTPer 224 and the second VTPer 226 can only execute only a process that does not require the user authentication. As a process that does not require user authentication, there is, for example, a process that refers to a table. The first VTPer 224 and the second VTPer 226 do not have the authentication authority for any user (user 1, user 2, user 3, and user 4) of the storage device 4. The first VTPer 224 and the second VTPer 226 cannot execute the authentication of user 1, user 2, user 3, or user 4, and the data protection function cannot be provided to the namespace region assigned to user 1, user 2, user 3, or user 4.

Here, when a certain specific user applies the data protection function for the namespace region assigned to himself/herself, the host 2 instructs the storage device 4 to perform user authentication for the namespace region to which the data protection function should be applied. According to the instruction, the PTPer 222 performs the user authentication and returns the result of the user authentication to the host 2.

The host 2 transmits the Assign method for the namespace region for which the user authentication is successful to the storage device 4. The PTPer 222 assigns a range to the namespace region according to the Assign method. In an example of assignment, the global range is assigned to the namespace region NSID1 of user 1, range 2 is assigned to the namespace region NSID2 of user 2, range 3 is assigned to the namespace region NSID3 of user 3, and range 4 is assigned to the namespace region NSID4 of user 4.

After assigning the range, the host 2 transmits the Set method for a certain range to the storage device 4. The PTPer 222 sets the locked state or the unlocked state of the range according to the Set method.

The PTPer 222 writes the setting information on the locked state or the unlocked state of the range to the Locking table. The Locking table includes rows that store lock information for each range. Each row stores the head position of the range, the length of the range, the locked state or the unlocked state, the namespace region ID to which the range belongs, information indicating whether the range is the NS global range, and the like.

When the table update is committed, the controller 10 refers to the locked state or the unlocked state of the Locking table, and sets the range to the read locked state or the read unlocked state, and the write locked state or the write unlocked state.

After assigning the range, the host 2 may transmit a Genkey method or an Erase method for a certain specific range to the storage device 4. The PTPer 222 regenerates the encryption key of the range and invalidates the data according to the Genkey method or the Erase method. In addition to the regeneration of the encryption key, the Erase method releases the lock of the range and initializes the password of the user.

The PTPer 222 executes the authentication of each user, and if each user authentication is successful, provides the data protection function for the namespace region assigned to the user. The PTPer 222 can provide the data protection function not only for the data stored in the PF 212 but also for the data stored in the first VF 214 and the data stored in the second VF 216 according to the TCG standard. As described above, by introducing the VTPer such as the first VTPer 224 and the second VTPer 226, it is possible to refer to a table or the like with each Anybody authority without going through the PF. Therefore, the data protection function of the storage device 4 is improved.

The PTPer 222 can also change the content of the range function once applied. For example, the PTPer 222 may assign a new range to the namespace region corresponding to the Assign method and set the locked state or the unlocked state for the range corresponding to the Set method. The PTPer 222 may change the locked state or the unlocked state of the range corresponding to the Set method. The PTPer 222 reflects the change of the locked state or the unlocked state in the Locking table.

Figure 13:
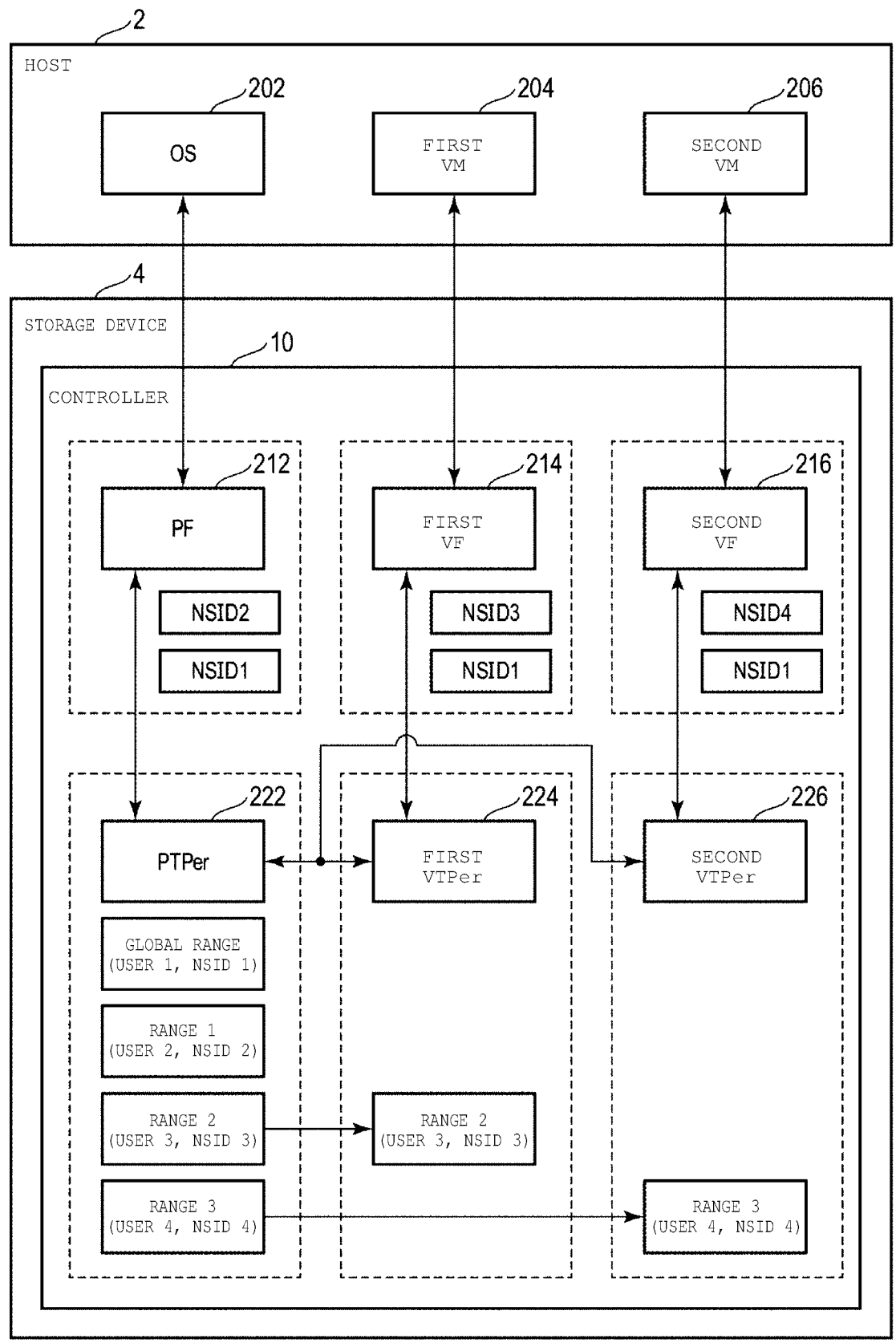
FIG. 13 is a block diagram for explaining another example of a data protection function of a storage device according to an embodiment.

FIG. 13 is a block diagram showing a logical configuration for explaining another example of the data protection function of the storage device 4 according to the embodiment.

In the example shown in FIG. 12, the PTPer 222 centrally provides the data protection function for all namespace regions. On the other hand, in the example shown in FIG. 13, the data protection function of the namespace region is individually provided by the PTPer 222, the first VTPer 224, or the second VTPer 226 for the device to which the namespace region is assigned. The user authentication authority of the namespace region is given to the PTPer 222, the first VTPer 224, or the second VTPer 226 related to the namespace region.

In the example shown in FIG. 13, when the data protection function is provided for the first time, the authentication authority of all the users of the storage device 4 is given to the PTPer 222, and the PTPer 222 provides the data protection function for all the namespace regions. After that, the authentication authority of user 3 assigned to the first VF 214 is transferred to the first VTPer 224, and the authentication authority of user 4 assigned to the second VF 216 is transferred to the second VTPer 226.

When the data protection function is provided for the second time or later, the PTPer 222, the first VTPer 224, or the second VTPer 226 for the device, to which the namespace region to which the data protection function is applied is assigned, performs the user authentication and provides the data protection function.

As described with reference to FIG. 12, when providing of the data protection function for a certain specific namespace region is requested from the user after generating the first VF 214 and the second VF 216, and the first VTPer 224 and the second VTPer 226, the host 2 instructs the storage device 4 to execute the user authentication for the namespace region. At this time, the PTPer 222 has the authority to authenticate all the users of the storage device 4.

In the case of the example shown in FIG. 13, the first VTPer 224 or the second VTPer 226 may have the user authentication authority. Therefore, it may be better for the controller 10, the PTPer 222, the first VTPer 224, or the second VTPer 226 to recognize whether the PTPer 222 has the user authentication authority for a certain user or whether the first VTPer 224 or the second VTPer 226 has the user authentication authority. Therefore, the Locking table that stores information on the locked state or the unlocked state further has a VF Assigned column for information on whether the owner of the user authentication authority was assigned to the VF.

FIG. 14 shows an example of the Locking table stored in the storage device 4 according to the embodiment. The Locking table is a table in the Locking SP 56 of the PTPer 222. The PTPer 222 writes the setting information of the locked state or the unlocked state regarding the range in the Locking table. The Locking table includes rows that store various information for each range. In the Locking table used in the example shown in FIG. 12, the VF Assigned column is excluded from the table in FIG. 14.

The PTPer 222 writes a row in the table, that is, an ID that specifies the range, in the UID column. The PTPer 222 writes names of ranges such as global range, range 1, range 2, and range 3 in the Name column. The PTPer 222 writes the logical address at the beginning of the range in the Range Start column. The PTPer 222 writes the length (byte) of the range in the Range Length column.

The PTPer 222 writes TRUE or FALSE in each of the ReadLocked column and the WriteLocked column. When the range is in the read locked state, the PTPer 222 writes TRUE in the ReadLocked column. When the range is in the write locked state, the PTPer 222 writes TRUE in the WriteLocked column.

The PTPer 222 writes the ID of the namespace region to which the range is assigned in the NamespaceID column. The PTPer 222 writes TRUE or FALSE in the Namespace Global Range column. When the range is the NS global range, the PTPer 222 writes TRUE in the Namespace Global Range column. If the range is not the NS global range, the PTPer 222 writes FALSE in the Namespace Global Range column. For the NS global range, the range is assigned to the entire namespace region, so the PTPer 222 writes 0 in the Range Start column and the Range Length column. The Range Start column and the Range Length column in which 0 is written are invalid.

The PTPer 222 writes TRUE or FALSE in the VF Assigned column. The VF Assigned column indicates whether the PTPer 222 has the authentication authority of the user assigned to the namespace region to which the range belongs, or whether the first VTPer 224 or the second VTPer 226 has the authentication authority.

When the PTPer 222 has the user authentication authority, the PTPer 222 writes the FALSE in the VF Assigned column. When the first VTPer 224 or the second VTPer 226 has the user authentication authority, that is, when the user authentication authority is transferred from the PTPer 222 to the first VTPer 224 or the second VTPer 226, the PTPer 222 writes TRUE in the VF Assigned column. In the initial state, the PTPer 222 has the authentication authority of all users, so FALSE is written in all the VF Assigned columns of the Locking table.

When receiving an instruction of the user authentication for a certain specific namespace region from the host 2, the controller 10 refers to the VF Assigned column of the row of the namespace region corresponding to the Locking table, to thereby know the module that has the user authentication authority for the namespace region. The controller 10 causes user authentication to be executed by a module having the user authentication authority, that is, the PTPer 222.

If the user authentication is successful, the host 2 transmits the Assign2 method and the Set method to the storage device 4.

The Assign2 method is a modification of the Assign method that assigns the range used in the above description. The Assign2 method has one parameter added to the Assign method. The parameter is information transmitted by the host 2 to the storage device 4. Parameters of the Assign2 method include Namespace ID, Range Start, Range Length, and VF Assigned. At this time, VF Assigned can be omitted.

The PTPer 222 assigns a range to the namespace region according to the parameters of the Assign2 method. In one example of assignment, the global range is assigned to the namespace region NSID1, range 1 is assigned to the namespace region NSID2, range 2 is assigned to the namespace region NSID3, and range 3 is assigned to the namespace region NSID4.

The PTPer 222 writes the assignment result in the Locking table. When the parameter VF Assigned of the Assign2 method is omitted, the PTPer 222 does not rewrite the data in the VF Assigned column of the Locking table.

The storage device 4 transmits a return value to the host 2 as a response of the Assign2 method. The return value of the Assign2 method includes UID and Namespace Global Range. The UID is the ID of the range assigned to the namespace region. When the range is the NS global range, the PTPer 222 writes TRUE in the Namespace Global Range column. When the range is the NS non-global range, the PTPer 222 writes FALSE in the Namespace Global Range column.

The Set method involves parameters that are information that the host 2 transmits to the storage device 4. The parameters of the Set method include the UID of the range, information on whether ReadLocked is TRUE or FALSE, and information on whether WriteLocked is TRUE or FALSE. The PTPer 222 writes the parameter data in the corresponding column of the Locking table and sets the locked state or the unlocked state of the range.

This ends the provision of the initial data protection function for a certain specific namespace region.

After that, when wanting to transfer the user authentication authority of the range for which the data protection function is previously provided, for example, the namespace region NSID3 to which range 2 belongs, from the PTPer 222 to the first VTPer 224, the host 2 transmits the Assign2 method to the storage device 4. The host 2 sets 2 in the Namespace ID in the parameter of the Assign2 method, and sets TRUE in the VF assigned. According to the parameter of this Assign2 method, the PTPer 222 rewrites the VF assigned column of the row of the namespace region NSID3 of the Locking table in the Locking SP 56 of the PTPer 222 from FALSE to TRUE.

The PTPer 222 transmits the Locking table to the first VTPer 224 and the second VTPer 226 each time the Locking table is updated. The first VTPer 224 stores the Locking table in the Locking SP 56 of the first VTPer 224. The second VTPer 226 stores the Locking table in the Locking SP 56 of the second VTPer 226. Therefore, the PTPer 222, the first VTPer 224, and the second VTPer 226 can refer to the Locking table having the same contents.

This completes the transfer of the user authentication authority of the namespace region NSID3 from the PTPer 222 to the first VTPer 224. After that, regarding the namespace region NSID3, the PTPer 222 cannot be used for the user authentication, and the first VTPer 224 can be used for the user authentication.

After that, when the user requests the provision of the data protection function for the namespace region NSID3, the host 2 instructs the storage device 4 to execute the user authentication. When the first VTPer 224 executes the user authentication for the namespace region NSID3 and succeeds in the user authentication, the data protection function is provided for the namespace region NSID3. The information on the setting of the data protection function applied by the first VTPer 224 is written by the first VTPer 224 in the Locking table in the Locking SP 56 of the first VTPer 224. The first VTPer 224 transmits the Locking table to the PTPer 222 and the second VTPer 226 each time the Locking table is updated.

When wanting to transfer the user authentication authority of the range for which the data protection function was previously provided, for example, the namespace region NSID4 to which range 3 belongs, from the PTPer 222 to the second VTPer 226, the host 2 transmits the Assign2 method to the storage device 4. The host 2 sets 3 in the Namespace ID in the parameter of the Assign2 method, and sets TRUE in VF assigned. According to the parameter of the Assign2 method, the PTPer 222 rewrites the VF assigned column of the row of the namespace region NSID4 of the Locking table in the Locking SP 56 of the PTPer 222 from FALSE to TRUE.

The PTPer 222 transmits the Locking table to the first VTPer 224 and the second VTPer 226 each time the Locking table is updated.

This completes the transfer of the user authentication authority of the namespace region NSID4 from the PTPer 222 to the second VTPer 226. After that, regarding the namespace region NSID4, the PTPer 222 cannot be used for the user authentication, and the second VTPer 226 can be used for the user authentication.

After that, when the user requests the provision of the data protection function for the namespace region NSID4, the host 2 instructs the storage device 4 to execute the user authentication. The second VTPer 226 executes the user authentication for the namespace region NSID4, and when the user authentication is successful, the data protection function is provided for the namespace region NSID4. The information on the setting of the data protection function applied by the second VTPer 226 is written by the second VTPer 226 in the Locking table in the Locking SP 56 of the second VTPer 226. The second VTPer 226 transmits the Locking table to the PTPer 222 and the first VTPer 224 every time the Locking table is updated.

This ends the transfer of the user authentication authority for a certain specific namespace region. As described above, by introducing the VTPer such as the first VTPer 224 and the second VTPer 226, the user authentication authority can be delegated from the PTPer to the VTPer, so that the VF itself follows the TCG standard and can perform the data protection of each namespace region individually. Therefore, the data protection function of the storage device 4 is improved.

As the delegation method of the user authentication authority, a method in which a parameter is added to an existing Assign method was described, but a new dedicated method may be defined.

At the time of transfer, it may be a condition that some restrictions are satisfied.

It may be a condition of transfer that the range is set to the single user mode (SUM). The range for which the SUM is set is a range for which the user who can use the data protection function is a single user.

A plurality of users can be set as users who can use the data protection function for a range for which the SUM is not set. In this case, the user who has the access right to the range is variable. In addition, one user may have the access right to multiple ranges. That is, there may be a user who has the access rights at the same time not only to the target range but also to the range assigned to the PTPer and the range assigned to another VTPer. Therefore, if the SUM setting is not a condition, it is necessary to define various special specifications, and there is a concern that these specifications will be complicated. The user assigned to a SUM-configured range can only rewrite rows in the Locking table for the range. Therefore, even if the user password of a certain VM is leaked, damage to the OS 202 and other VM is blocked.

FIG. 15 shows an example of a LockingInfo table stored in the storage device 4 according to the embodiment. The LockingInfo table is a table in the Locking SP 56 of the PTPer 222. The LockingInfo table includes a row that stores range meta information (number of ranges, etc.).

The PTPer 222 writes an ID indicating the row of the LockingInfo table in the UID column. The PTPer 222 writes a character column such as "LockingInfo" in the Name column. The PTPer 222 writes information indicating the presence and absence of medium encryption support in the Encrypt Support column. The PTPer 222 writes the maximum number of ranges (excluding the global range) in the Max Ranges column. The PTPer 222 writes information indicating whether Alignment is necessary in the Alignment Required column. The PTPer 222 writes the byte length per block in the Logical Block Size column. The PTPer 222 writes the Alignment Granularity of the Range Start and the Range Length in the Alignment Granularity column. The PTPer 222 writes the minimum designatable Aligned LBA in the Lowest Aligned LBA column.

The Single User Mode Ranges column stores information indicating the range set in the single user mode in a list format ([range 1], [range 1, range 2], or the like). When the entire range is set to the single user mode, the Single User Mode Ranges column stores only the UID indicating the table called the Locking table. The Single User Mode Ranges column is designated by the Activate method or Reactivate method.

Even if the delegation of the user authentication authority is instructed by the Assign2 method from the host 2, the PTPer 222 refers to the Single User Mode Ranges column of the LockingInfo table, and if the range is not set to SUM, the VF Assigned column of the Locking table is not rewritten.

The transfer condition may be that at least one of the read locked state and the write locked state of the range is released. That is, it may be a condition that the encryption key (MEK) of the range can be derived without inputting the password. After the transfer, the encryption key is protected by the password after transfer. There are two cases regarding the protection of encryption keys.

Even if the delegation of the user authentication authority is instructed by the Assign method from the host 2, the PTPer 222 refers to the ReadLocked column and the WriteLocked column of the Locking table, and if the range is in the read locked state and the write locked state, (i) as a method error, rewriting of the VF Assigned column of the Locking table is not executed, or (ii) the execution of the cryptographic erase for the range, or the read locked state or the write locked state is released, and then rewriting of the VF Assigned column of the Locking table is executed.

The transfer methods for the password will be described.

The first method is a method of transferring the password as it is (unchanged). This requires secure cooperation between the OS 202, and the first VM 202 and the second VM 204.

The second method is a method of adding a new parameter New PIN to the Assign2 method instructing the transfer and transferring according to this parameter. The New PIN is the password used after the transfer. This also requires secure cooperation between the OS 202, and the first VM 202 and the second VM 204.

The third method is a method in which a determined fixed value is used as the password after transfer.

Figure 16:
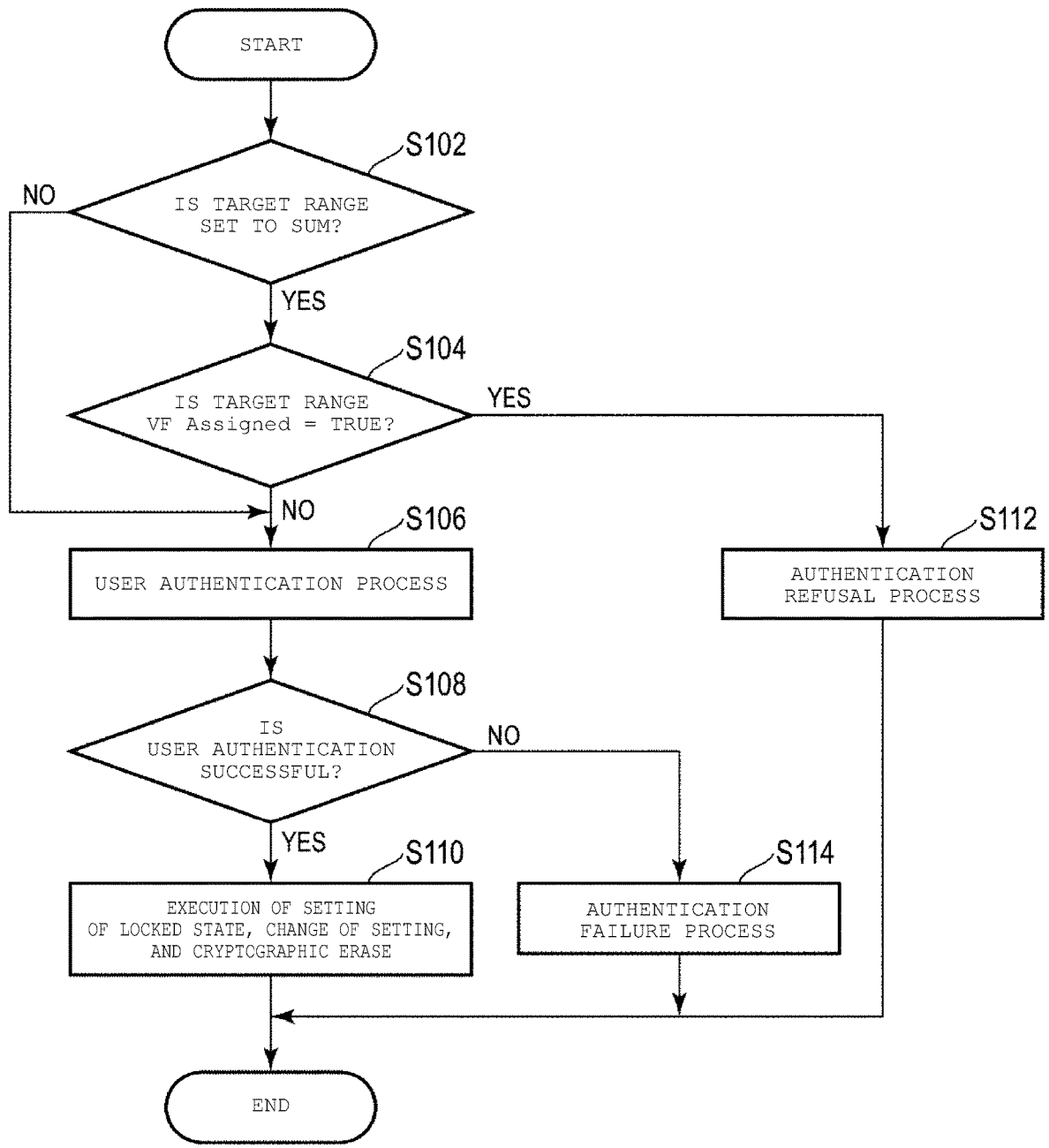
FIG. 16 is a flowchart of an authentication process for a physical trusted peripheral of a storage device according to an embodiment.

FIG. 16 is a flowchart showing an example of the authentication process by the PTPer 222 of the storage device 4 according to the embodiment. FIG. 16 describes a process when the user authentication authority of some users is transferred from the PTPer 222 to the first VTPer 224 or the second VTPer 226 as shown in FIG. 13.

When the user requests the host 2 to use the data protection function for a certain range, the host 2 instructs the storage device 4 to execute the user authentication.

When the execution of the user authentication is instructed, in step S102, the PTPer 222 determines whether the target range is set to SUM by referring to the Single User Mode Ranges column of the LockingInfo table.

If the determination result in step S102 is yes (when the range is set to SUM), in step S104, the PTPer 222 determines whether the VF Assigned column of the Locking table is TRUE.

If the determination result in step S104 is no (when the VF Assigned column is FALSE), in step S106, the PTPer 222 executes the user authentication process.

If the determination result in step S102 is no (the range is not set to SUM), in step S106, the PTPer 222 executes the user authentication process.

In step S108, the PTPer 222 determines whether the user authentication is successful.

If the user authentication is successful (yes in step S108), in step S110, the PTPer 222 performs the execution of setting of the locked state or the unlocked state, changing of the setting, or cryptographic erase corresponding to the method transmitted from the host 2. After that, the process ends.

If the user authentication fails (no in step S108), in step S114, the PTPer 222 performs the authentication failure process. The authentication failure process may be a process of notifying the user of the authentication failure. After that, the process ends.

If the determination result in step S104 is yes (when the VF Assigned column is TRUE), in step S106, the PTPer 222 performs the authentication refusal process. The authentication refusal process may be a process of notifying the user of the reason for refusal of authentication. After that, the process ends.

Figure 17:
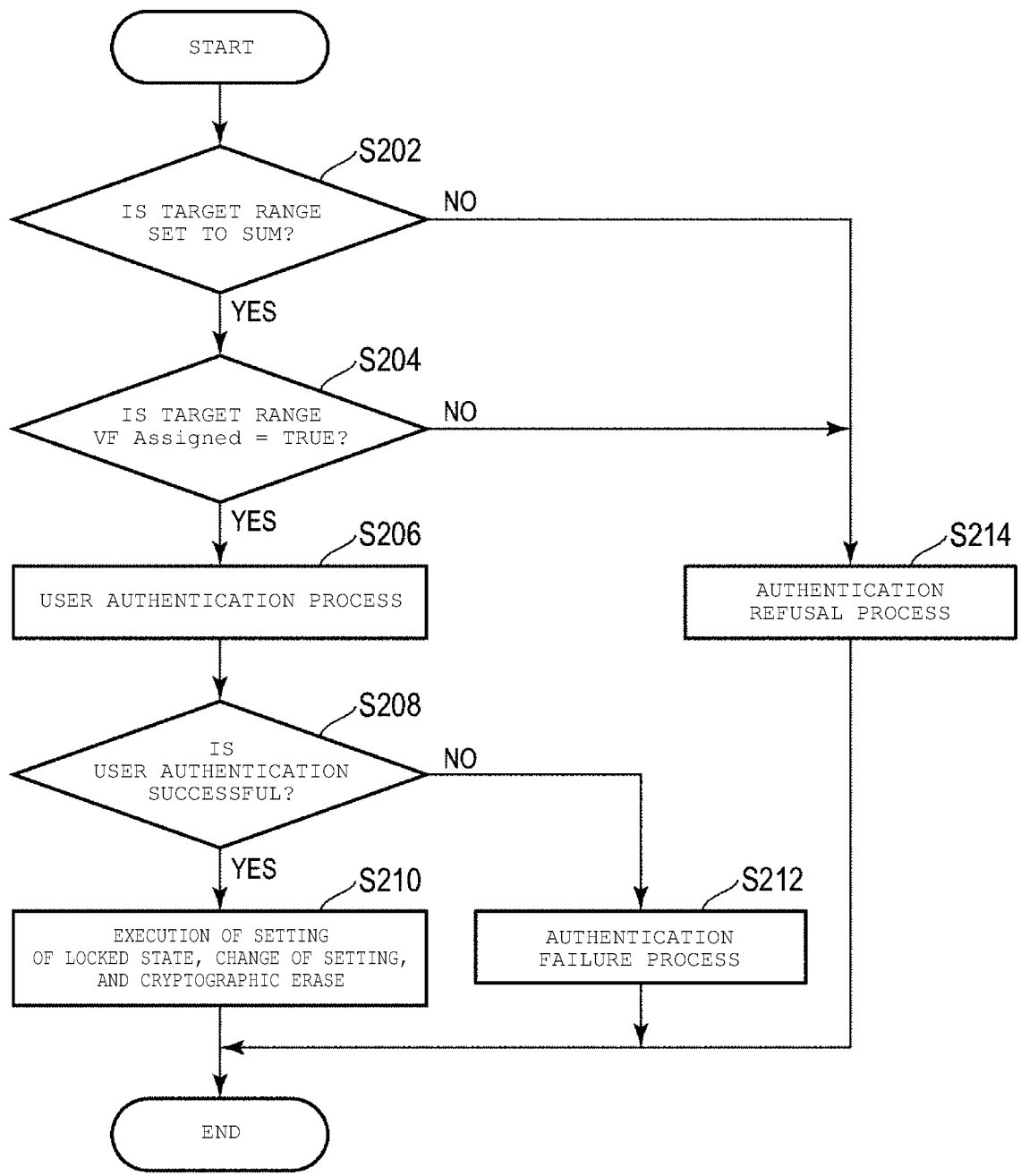
FIG. 17 is a flowchart of an authentication process for a virtual trusted peripheral of the storage device according to the embodiment.

FIG. 17 is a flowchart showing an example of the authentication process by the first VTPer 224 of the storage device 4. Since the flowchart of the authentication process by the second VTPer 226 is the same as the flowchart regarding the first VTPer 224, additional description thereof will be omitted.

When the execution of user authentication is instructed, in step S202, the first VTPer 224 determines whether the target range is set to SUM by referring to the Single User Mode Ranges column of the LockingInfo table.

If the determination result in step S202 is yes (when the range is set to SUM), in step S204, the first VTPer 224 determines whether the VF Assigned column of the Locking table is TRUE.

If the determination result in step S204 is yes (when the VF Assigned column is TRUE), in step S206, the first VTPer 224 executes the user authentication process.

In step S208, the first VTPer 224 determines whether the user authentication is successful.

If the user authentication is successful (yes in step S208), in step S210, the first VTPer 224 performs the execution of setting of the locked state or the unlocked state, changing of the setting, or cryptographic erase corresponding to the method transmitted from the host 2. After that, the process ends.

If the user authentication fails (no in step S208), in step S212, the first VTPer 224 performs the authentication failure process. The authentication failure process may be a process of notifying the user of the authentication failure. After that, the process ends.

When the determination result in step S202 is no (when the range is not set to SUM) and when the determination result in step S204 is no (when the VF Assigned column is FALSE), in step S214, the first VTPer 224 and the PTPer 222 perform the authentication refusal process. After that, the process ends.

Release of the transfer will be explained. The host 2 can transfer the user authentication authority, which is transferred from the PTPer 222 to the first VTPer 224 or the second VTPer 226, to the PTPer 222 (referred to as release of transfer). The transfer release is by the DeAssign2 method.

The DeAssign2 method is a modification of the DeAssign method used in the above description to release the range assignment. The DeAssign2 method has one parameter added to the DeAssign method. The parameters of the DeAssign2 method include the UID of the range and the VF Assigned.

The host 2 transmits the DeAssign2 method to the storage device 4. The host 2 sets the UID of the range in the namespace region, for which the user authentication authority is to be transferred to the PTPer 222, to the UID in the parameter of the DeAssign2 method, and sets the VF Assigned to FALSE. According to the parameter of the DeAssign2 method, the PTPer 222 rewrites the VF assgined of the row corresponding to the UID of the Locking table in the Locking SP 56 of the PTPer 222 from TRUE to FALSE.

Therefore, the delegation of the user authentication authority to the first VTPer 224 or the second VTPer 226 is released, and the authentication authority returns to the PTPer 222.

As the delegation release method of the user authentication authority, the method in which the parameter is added to the existing DeAssign method was described, but a new method dedicated thereto may be defined.

Even for the transfer release, a condition that the same restrictions as those for the transfer are satisfied may be provided. The condition that the range is set to SUM may be a condition of the transfer release. Alternatively, the condition of the transfer release may be that at least one of the read lock and the write lock of the range is released.

The transfer release method of the password can be the same as the transfer method of the password. Further, in the case of the transfer release, the PTPer 222 can store the password before the transfer, and when the transfer is released, the password can be returned to the stored password.

A table relating to the data protection function stored in the PTPer 222, the first VTPer 224, and the second VTPer 226 will be described.

(1) The tables based on the base template are as follows:
SPInfo table that stores the ID of the Locking SP,
SPTemplates table that stores the embedded template information,
Table that stores the ID information of each table,
MethodID table that stores the ID of each method,
AccessControl table that stores the authority setting information of each method,
ACE table that stores Access Control Element,
Authority table that stores the authority setting information of the manager and the user,
C_PIN table that stores PIN information, and/or
SecretProtect table that stores the protection method of confidential information such as PIN and MEK.

(2) The tables based on the Locking plate are as follows:
LockingInfo table,
Locking table,
MBRControl table that stores setting information such as availability of MBR and completion of MBR shadowing,
MBR table (byte table) that stores shadow MBR (128 MB or more), and/or
K_AES_256 table that stores medium encryption information.

(3) As a table that is not based on a template, there is a DataStore table (byte table) that stores general-purpose security data (minimum 10 MB).

Since authentication authority is delegated to these tables, the PTPer 222, the first VTPer 224, and the second VTPer 226 may all store these tables. If the PTPer 222, the first VTPer 224, and the second VTPer 226 cannot store all the tables due to a relationship of resources, it is sufficient that the first VTPer 224 and the second VTPer 226 can refer to the table of the PTPer 222.

In the TCG standard, the Revert method, the RevertSP method, and the Reactivate method are defined as the initialization method of the storage 12. The range for which the user authentication authority (that is, the authority to use the data protection function) is transferred to the first VTPer 224 or the second VTPer 226 may be excluded from the initialization target by the Revert method and the RevertSP method. The range authenticated by the PSID (label ID) may be initialized by the Revert method and the RevertSP method even if the user authentication authority is transferred to the first VTPer 224 or the second VTPer 226.

Information indicating the state of the storage device 4, such as whether the user authentication authority was transferred to the first VTPer 224 or the second VTPer 226, may be transmitted from the storage device 4 to the host 2. An example thereof is the Level 0 discovery of the TCG standard. When the host 2 transmits the Level 0 discovery to the storage device 4, the storage device 4 transmits a response of the Level 0 discovery to the host 2. The storage device 4 may include the VF Assigned data in the response of the Level 0 discovery.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A storage device, comprising:
   a first storage region to which a first user is assigned and a second storage region to which a second user is assigned;
   a first controller capable of providing a data protection function for the first storage region and a data protection function for the second storage region; and
   a second controller capable of providing the data protection function for the second storage region, wherein
   the first controller includes a table for storing information about the data protection function,
   the second controller is capable of referring to the table,
   the first controller has a first authority to execute a first user authentication for the first storage region and a second authority to execute a second user authentication for the second storage region, and
   the first controller is configured to:
     provide the data protection function for the first storage region when the first user authentication is successful, and
     provide the data protection function for the second storage region when the second user authentication is successful.

2. The storage device according to claim 1, wherein
   when the first user authentication is successful, the first controller puts the first storage region in a read locked state or a write locked state, and
   when the second user authentication is successful, the first controller puts the second storage region in a read locked state or a write locked state.

3. The storage device according to claim 1, wherein
   the first storage region stores data encrypted with a first encryption key,
   the second storage region stores data encrypted with a second encryption key,
   the first controller changes the first encryption key when the first user authentication is successful, and
   the first controller changes the second encryption key when the second user authentication is successful.

4. The storage device according to claim 1, wherein the first controller transfers the second authority to the second controller in response to an instruction from an external device.

5. The storage device according to claim 4, wherein, when the second authority is transferred from the first controller to the second controller and the second controller succeeds in the second user authentication, the second controller provides the data protection function for the second storage region.

6. The storage device according to claim 4, wherein, after the second authority is transferred from the first controller to the second controller, the first controller is no longer capable of executing the second user authentication.

7. The storage device according to claim 4, wherein, when a plurality of users are assigned to the first storage region and a plurality of users are assigned to the second storage region, the first controller is not capable of transferring the second authority to the second controller.

8. The storage device according to claim 4, wherein, when the first storage region is in a read locked state or a write locked state, the first controller is not capable of transferring the second authority to the second controller.

9. The storage device according to claim 4, wherein,
   when the first user authentication is successful, the first controller puts the first storage region in a read locked state or a write locked state, and
   when the second authority is transferred from the first controller to the second controller and the second controller succeeds in the second user authentication, the second controller puts the second storage region in a read locked state or a write locked state.

10. The storage device according to claim 4, wherein
    the first storage region stores data encrypted with a first encryption key,
    the second storage region stores data encrypted with a second encryption key,
    when the first user authentication is successful, the first controller changes the first encryption key, and
    when the second authority is transferred from the first controller to the second controller and the second controller succeeds in the second user authentication, the second controller changes the second encryption key.

11. The storage device according to claim 4, wherein
    the table stores first information indicating whether the second controller has the second authority, and
    the second controller refers to the first information to determine whether the second authority was transferred from the first controller to the second controller.

12. The storage device according to claim 1, wherein the first controller is further configured to:
    transfer the second authority from the first controller to the second controller in response to a first instruction from an external device, and
    transfer the second authority from the second controller to the first controller in response to a second instruction from the external device.

13. The storage device according to claim 1, wherein
    the first controller and the second controller are connectable to an external host device via a Front End (FE) unit, and
    the FE unit conforms to an SR-IOV standard.

14. A storage device, comprising:
    a storage unit including:
      a first storage region to which a first user is assigned, and a second storage region to which a second user is assigned;

a first controller with a table storing information indicating whether the first and second storage regions can be protected by a data protection function, the first controller configured to:

execute a first user authentication for the first storage region to determine whether to permit protection of the first storage region by the data protection function, and execute a second user authentication for the second storage region to determine whether to permit protection of the second storage region by the data protection function; and a second controller configured to:

receive a delegated authority from the first controller to execute the second user authentication for the second storage region, after receiving the delegated authority, execute the second user authentication for the second storage region to determine whether to permit protection of the second storage region by the data protection function, wherein the second controller refers to the table of the first controller to determine whether to permit the protection of the second storage region by the data protection function.

15. The storage device according to claim 14, wherein, when the first storage region is in a read locked state or a write locked state, the first controller cannot send the delegated authority to the second controller.

16. The storage device according to claim 14, wherein the first controller sends the delegated authority to the second controller in response to an instruction from an external device.

17. A storage system, comprising:
a host device;
a storage unit having:
a first storage region to which a first user is assigned, and
a second storage region to which a second user is assigned;
a controller device connected to the host device and the storage unit, the controller device including:
a first controller capable of providing a data protection function for the first storage region and a data protection function for the second storage region; and
a second controller capable of providing the data protection function for the second storage region, wherein
the first controller includes a table for storing information about the data protection function,
the second controller is capable of referring to the table,
the first controller has a first authority to execute a first user authentication for the first storage region and a second authority to execute a second user authentication for the second storage region, and
the first controller is configured to:
provide the data protection function for the first storage region when the first user authentication is successful, and
provide the data protection function for the second storage region when the second user authentication is successful.

18. The storage system according to claim 17, wherein the first controller transfers the second authority to the second controller in response to an instruction from the host device.

19. The storage system according to claim 18, wherein, when the second authority is transferred from the first controller to the second controller and the second controller succeeds in the second user authentication, the second controller provides the data protection function for the second storage region.

20. The storage system according to claim 18, wherein, after the second authority is transferred from the first controller to the second controller, the first controller is no longer capable of executing the second user authentication.

* * * * *